US012522492B2

(12) United States Patent
Novak et al.

(10) Patent No.: US 12,522,492 B2
(45) Date of Patent: Jan. 13, 2026

(54) CAN PIERCING DEVICE FOR RAPID BEVERAGE CONSUMPTION

(71) Applicant: Well Served LLC, New Orleans, LA (US)

(72) Inventors: Michael Novak, Buffalo, NY (US); Nathanial Makin, New Orleans, LA (US)

( * ) Notice: Subject to any disclaimer, the term of this patent is extended or adjusted under 35 U.S.C. 154(b) by 141 days.

(21) Appl. No.: 18/583,135

(22) Filed: Feb. 21, 2024

(65) Prior Publication Data

US 2025/0263282 A1 Aug. 21, 2025

(51) Int. Cl.
*B67B 7/00* (2006.01)

(52) U.S. Cl.
CPC .................................... *B67B 7/24* (2013.01)

(58) Field of Classification Search
CPC ....... B67B 7/24; B67B 2007/303; B67B 7/34; B67B 7/30; B67B 7/44; B67B 7/16
See application file for complete search history.

(56) References Cited

U.S. PATENT DOCUMENTS 684,212 A * 10/1901 Fisk .......................... B67B 7/30 30/438
1,599,992 A * 9/1926 De Velbiss ................ B67B 7/24 220/278
1,640,505 A * 8/1927 Kraus ....................... B67B 7/24 220/278
1,813,620 A * 7/1931 Henry ....................... B67B 7/24 30/445
1,863,853 A * 6/1932 Jackson .................... B67B 7/28 222/83.5
2,095,660 A * 10/1937 Dooley ..................... B67B 7/24 30/445
2,272,204 A * 2/1942 Hothersall ................ B67B 7/24 30/448
2,576,800 A * 11/1951 Menderman ............. B67B 7/44 7/152
2,596,476 A * 5/1952 Forstrom .................. B67B 7/24 30/448
2,636,258 A * 4/1953 Jones ........................ B67B 7/24 30/447
2,683,307 A * 7/1954 Stumpp ..................... B67B 7/24 30/448
2,713,905 A 7/1955 Hartley
2,725,622 A * 12/1955 Geier ........................ B67B 7/24 30/447
2,933,957 A * 4/1960 Wendlandt ................ B67B 7/16 81/3.27
2,950,529 A * 8/1960 Anastasia ................. B67B 7/24 30/448
3,032,872 A * 5/1962 Zibbell ..................... B67B 7/24 30/448
(Continued)

*Primary Examiner* — Jonathan G Riley
(74) *Attorney, Agent, or Firm* — Boris Leschinsky

(57) ABSTRACT

A can piercing device for facilitating rapid beverage consumption from a can features a spring-loaded cam with a claw extending therefrom, which is activated by pulling the trigger of a toy revolver gun. A simulated projectile aligned with the barrel and the hammer of the toy gun activates a release mechanism, causing the claw to emerge from the front end of the device, puncture, and tear an opening in the beverage can for entertainment purposes of the user.

8 Claims, 18 Drawing Sheets

(56) References Cited

U.S. PATENT DOCUMENTS

| | | | | |
|---|---|---|---|---|
| 3,263,327 | A * | 8/1966 | Miller | B67B 7/24 30/448 |
| 3,727,247 | A * | 4/1973 | Miller | B67B 7/44 7/152 |
| 8,387,264 | B1 | 3/2013 | Pritchard | |
| 10,760,871 | B2 | 9/2020 | Smith | |
| 10,947,097 | B2 | 3/2021 | Clifton | |
| 11,261,071 | B2 | 3/2022 | Clifton | |
| 2004/0056033 | A1 * | 3/2004 | Bohlman | B67B 7/24 220/278 |
| 2014/0250700 | A1 | 9/2014 | Liotta et al. | |
| 2023/0339737 | A1 | 10/2023 | Widmann | |

* cited by examiner

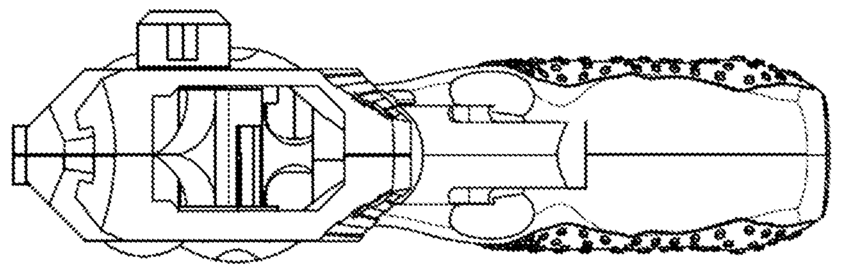
Fig. 3
Fig. 2
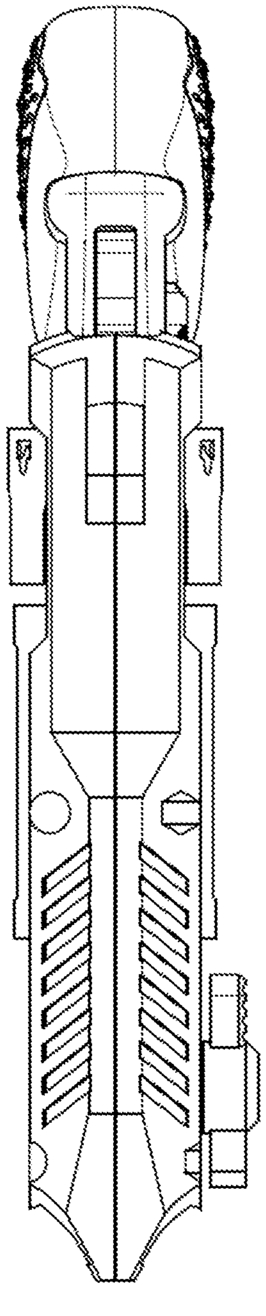
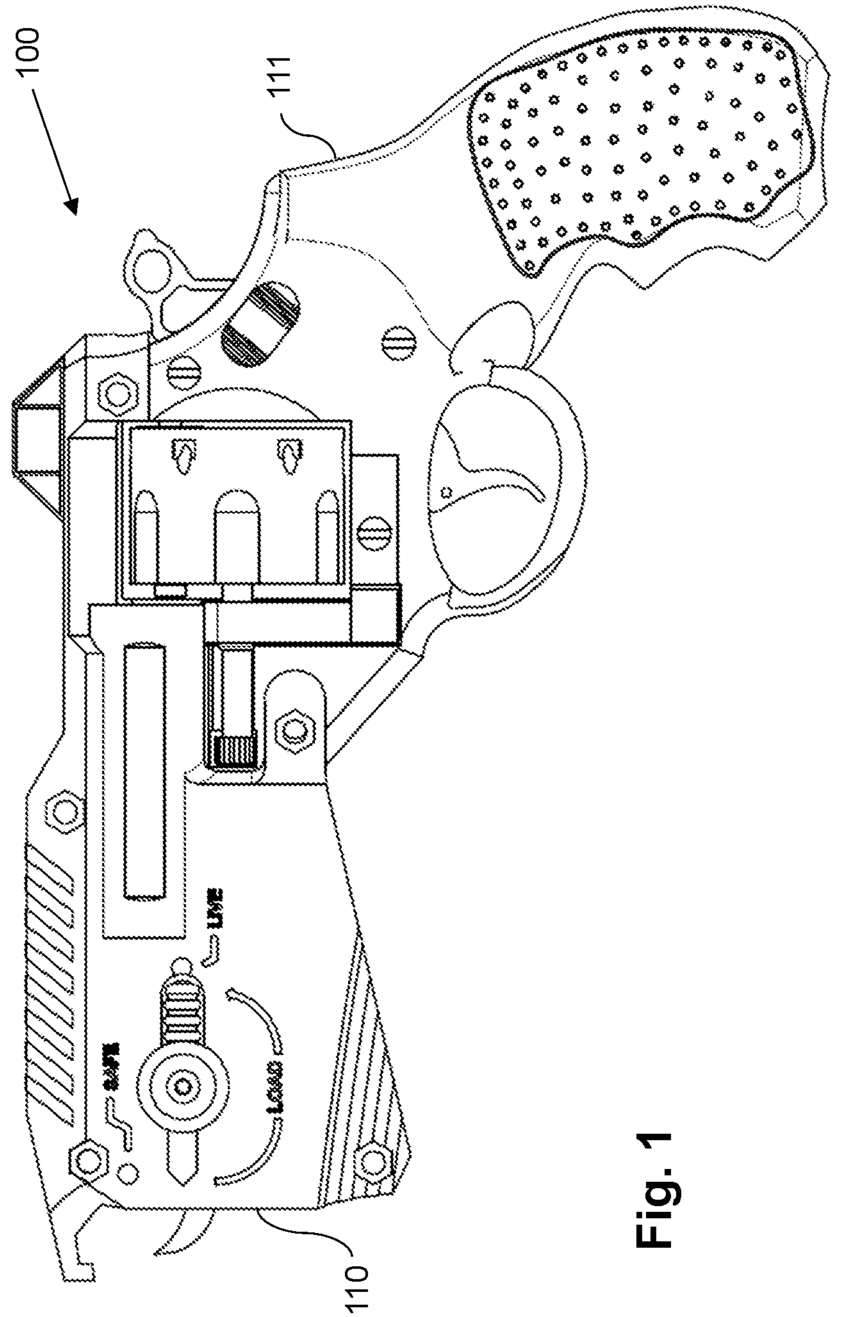
Fig. 1

CAN PIERCING DEVICE FOR RAPID BEVERAGE CONSUMPTION

BACKGROUND

Without limiting the scope of the invention, its background is described in connection with can piercing devices. More particularly, the invention describes a can piercing device adapted to facilitate rapid beverage consumption from the can.

Consuming a beverage from a beverage can may be transformed into a game or enhanced with a variety of entertainment effects. One example of such an entertainment effect is referred to as "shotgunning a beer", which is a method of consuming a canned beer very quickly, typically in a social setting and for entertainment purposes. The process begins with holding a can of beer horizontally and then piercing a small hole near the bottom edge of the can. This hole is typically made with a sharp object like a key or a knife. Once the hole is created, the drinker places their mouth over it, ensuring a tight seal. Next, while still holding the can with the hole facing upwards, the drinker pulls the tab at the top of the can to open it. This action releases the pressure inside the can, causing the beer to flow rapidly out of the hole due to gravity and pressure differences. The drinker then tilts their head back and drinks the beer as quickly as possible directly from the hole. The goal is to empty the can in as little time as possible, typically a few seconds. This method is popular in party environments and is often associated with a festive, competitive spirit among participants. It requires some skill and practice to do it efficiently without spilling the beer.

Shotgunning a beer, while often viewed as a fun and competitive drinking game, carries several shortcomings and risks:

- Risk of Injury: The process of making a hole in the can with a sharp object like a key or a knife can lead to accidental cuts or injuries, especially if the person is already impaired by alcohol,
- Spillage and Waste: Often, in the haste piercing the can quickly and by hand, a significant amount of beer is spilled, leading to wastage and mess,
- Sanitation Concerns: The act of piercing the can with a non-sterile object like a key or knife can introduce bacteria or other contaminants into the beer, posing a risk of infection.

These considerations gave rise to the market availability of specialized devices, each designed to enhance the experience but also carrying distinct advantages and disadvantages.

One common tool is the shotgun keychain tool. This compact, portable device is specifically designed for safely and efficiently piercing a beer can. Its small size makes it convenient to carry, often attached to a keychain. The major advantage is the reduced risk of injury compared to using improvised sharp objects. However, despite its safety features, it still encourages rapid alcohol consumption with all its associated risks, and due to its small size, it can be easily misplaced.

Another popular device is the can piercing tool combined with a funnel. This setup allows for a more controlled flow of beer, as the beer flows through the funnel once the can is pierced. The advantages include a reduced risk of choking and the ability for multiple people to use it (with proper cleaning). However, it is bulkier, less portable, and requires regular cleaning for hygiene.

The beer bong, while not exclusively for shotgunning, is another device used for a similar purpose. It typically consists of a funnel attached to a tube. The main advantage is the communal aspect of its use in party settings. However, it's cumbersome and challenging to clean, and its use can lead to even quicker intoxication and increased choking risks.

Some enthusiasts opt for automated shotgunning devices. These advanced gadgets automate the can-piercing process and control the beer's flow, providing a consistent and efficient experience. The major advantage is ease of use and reduced risk of injury. However, they can be expensive, have limited entertainment value, and may not function reliably at all times. The need exists, therefore, for a better can piercing device that addresses the issues listed above and provides a good experience for the users.

There is also a need for a more broadly used tool that allows the piercing of a can containing a variety of beverages, both carbonated and non-carbonated.

SUMMARY

Accordingly, it is an object of the present invention to overcome these and other drawbacks of the prior art by providing a novel can piercing device capable of safely and consistently piercing a beverage can.

It is another object of the present invention to provide a novel can piercing device that facilitates playing games and provides entertainment to enhance a beverage consumption experience.

The novel can piercing device of the invention may include a housing with a front end equipped with a spring-loaded pivot. The pivot may be rotatably supported inside the front end of the housing and feature a claw protruding therefrom. The claw may be shaped and sized to first pierce and then tear the can upon engaging therewith, thereby making an opening that is large enough to allow consuming the beverage from the can.

The pivot may be supported to allow its rotation so as to move the claw between a retracted position and an extended position. In the retracted position, the claw may be stored inside the housing, while in the extended position, the claw may protrude outside the front end of the housing.

Furthermore, the front end of the housing may feature a pivot spring configured to urge the pivot to move the claw from the retracted position to the extended position. Upon being released by a release mechanism supported by the housing, the pivot spring may be configured to push on the pivot to cause the claw to move outside the front end of the housing.

In use, the act of disengaging the release mechanism from the pivot liberates the pivot to rotate the claw from the retracted position to the extended position as urged by the pivot spring, causing the claw to pierce and tear the can upon engaging therewith.

In further embodiments, the housing may include a back end with a spring-loaded hammer movable between a first position and a second position, similar to a toy revolver gun. A hammer spring may be provided and configured to urge the hammer to move from the first position to the second position. The back end may further include a trigger configured to release the hammer from the first position upon pulling thereon, and a rotatable cylinder with a plurality of projectile positions, each position is configured to accept a simulated projectile therein.

The simulated projectile may include an elongated hollow body sized to fit within any of the projectile positions of the cylinder. The elongated hollow body may slidingly support a spring-loaded internal pin extending from the elongated hollow body on both ends thereof.

In use of the can piercing device, if the simulated projectile is present in the projectile position of the cylinder, which is aligned with the hammer, releasing the hammer by pulling the trigger activates a mechanical transmission configured to release the claw from the retracted position and cause the claw to pierce the can. At the same time, if the simulated projectile is not present in the projectile position of the cylinder, which is aligned with the hammer, releasing the hammer by pulling the trigger does not activate the mechanical transmission, thereby not causing the claw to pierce the can.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is a side view of the novel can piercing device,

FIG. 2 is a top view of the same,

FIG. 3 is a front view of the same,

DETAILED DESCRIPTION OF PREFERRED EMBODIMENTS OF THE INVENTION

Figure 6:
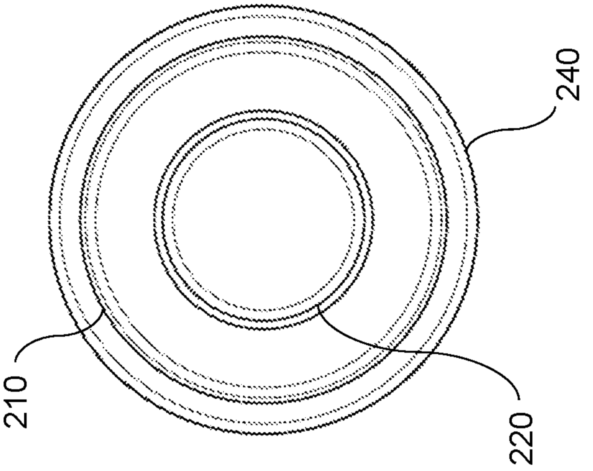
FIG. 6 is a front view of the same as in FIG. 4.
Figure 4:
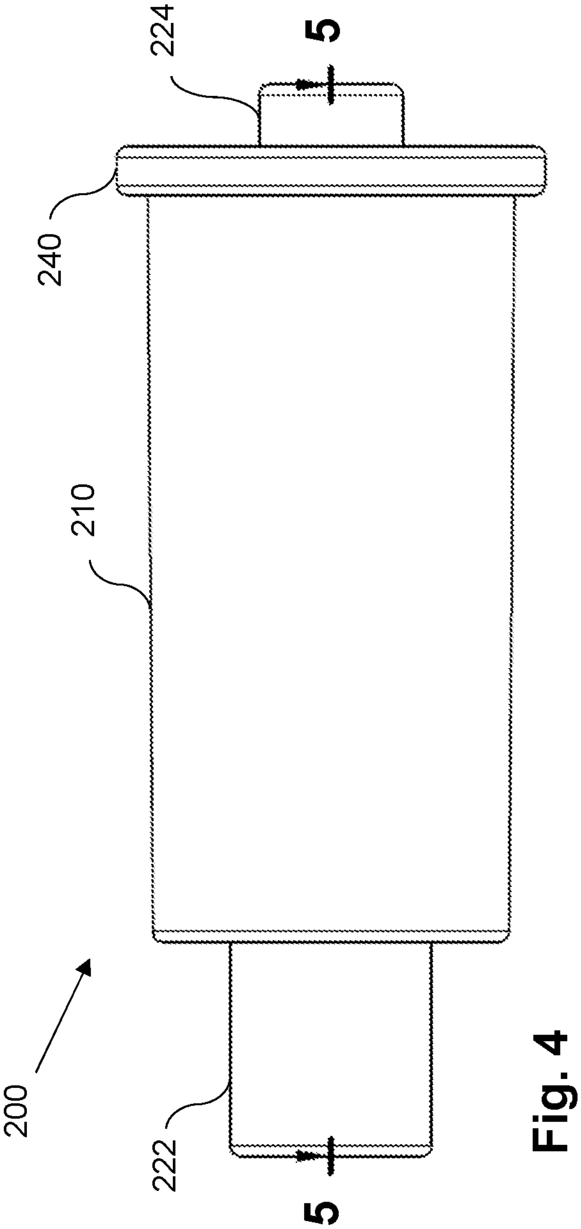
FIG. 4 is a side view of the simulated projectile for the can piercing device.
Figure 5:
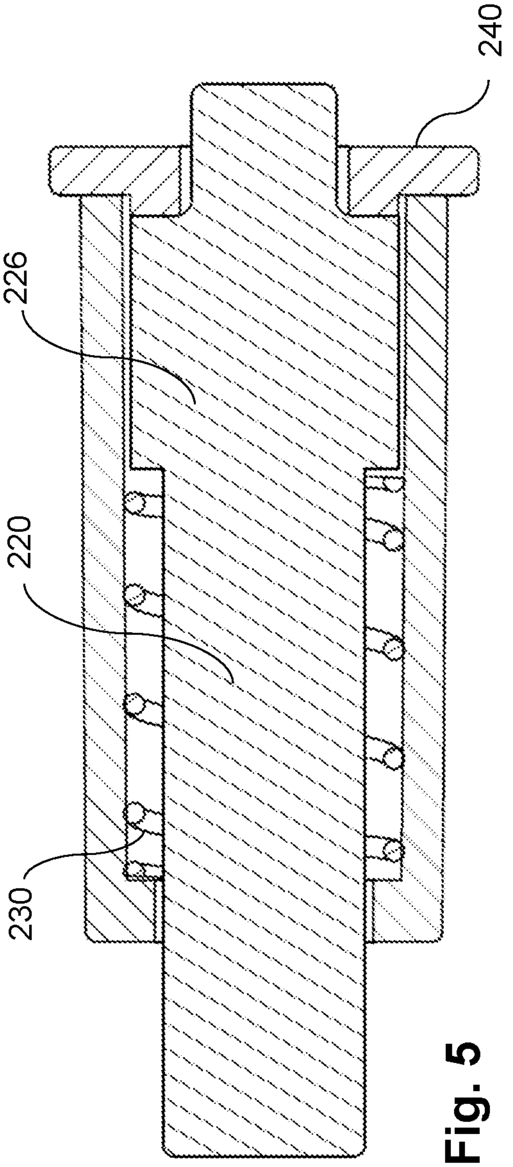
FIG. 5 is a cross-sectional side view of the simulated projectile of FIG. 4.
Figure 7:
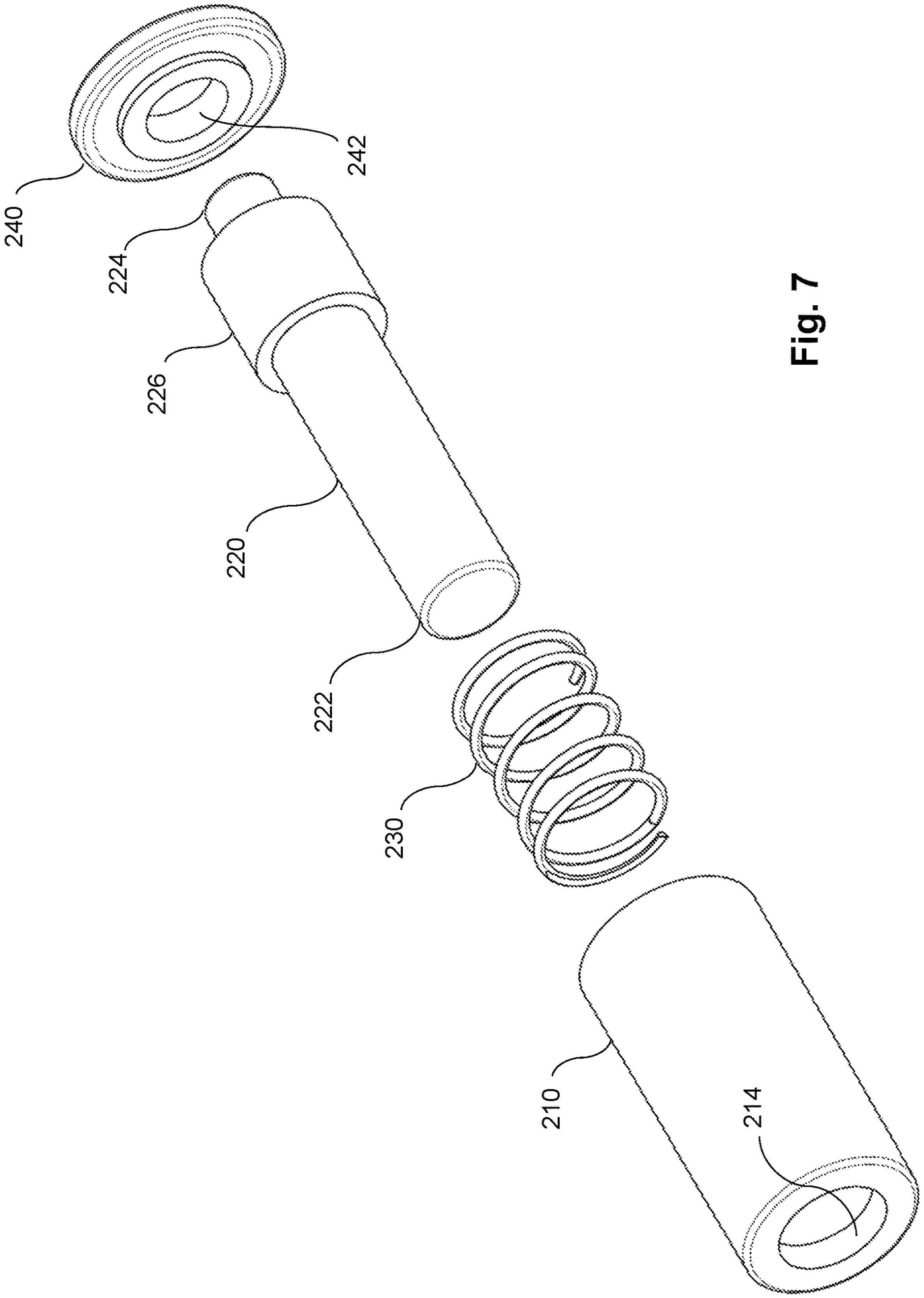
FIG. 7 is an exploded view of the same as in FIG. 4.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIGS. 1-3 show a general view of the can piercing device of the present invention. In some embodiments, the device 100 may be shaped like a toy gun, as seen in the drawings. However, the invention is not limited in this regard, as the can piercing device may be shaped differently depending on the preferences of the consumers. Continuing with the illustrations in the figures, the device 100 may generally define a housing with a front end 110 and a back end 111. The front end 110 may be adapted to engage with the beverage can, while the back end 111 may include a trigger and other operating components that activate the piercing function at the front end 110.

Figure 10:
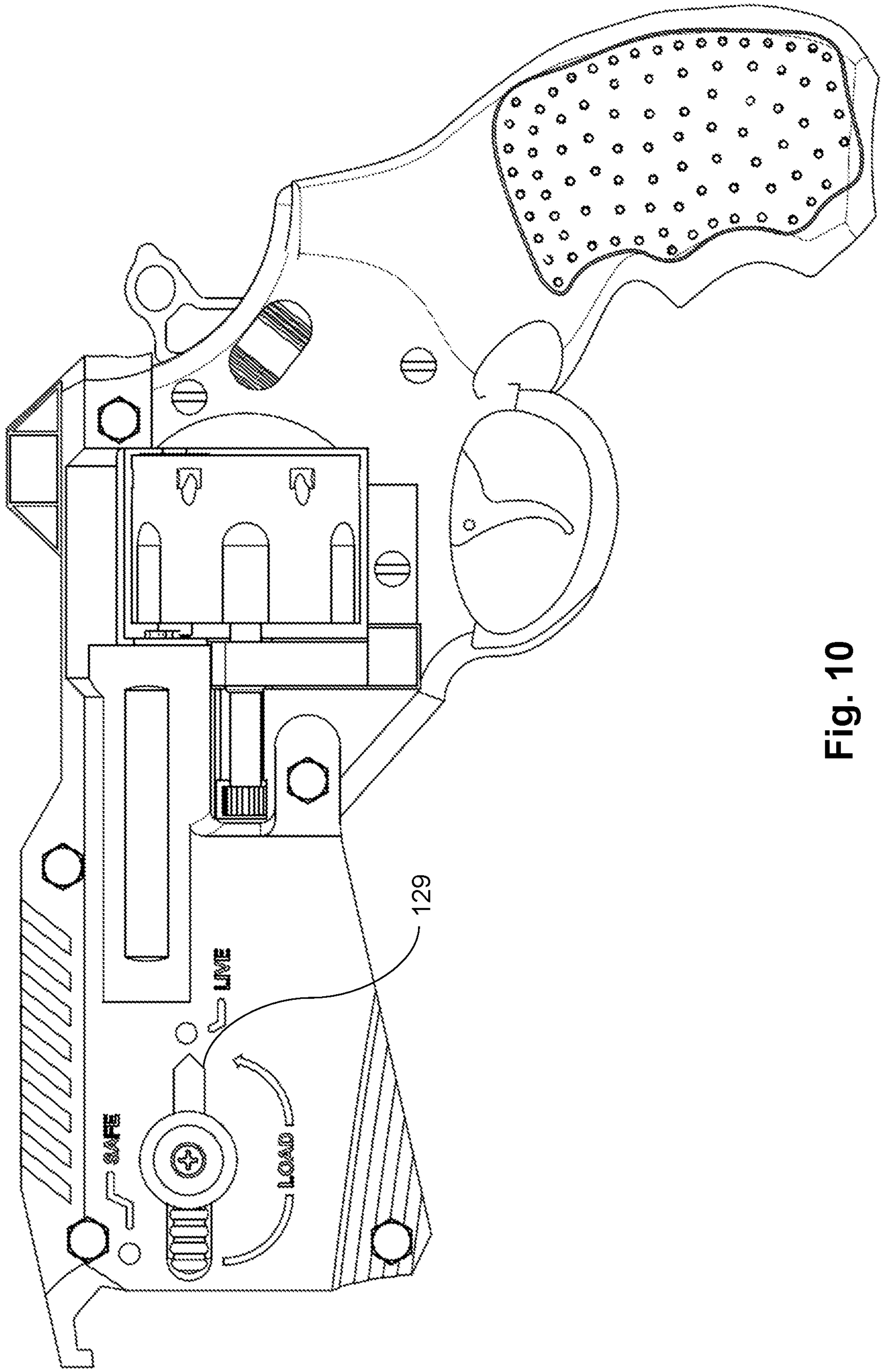
FIG. 10 is a side view of the can piercing device showing the details of the front end thereof with the claw in the retracted position.
Figure 11:
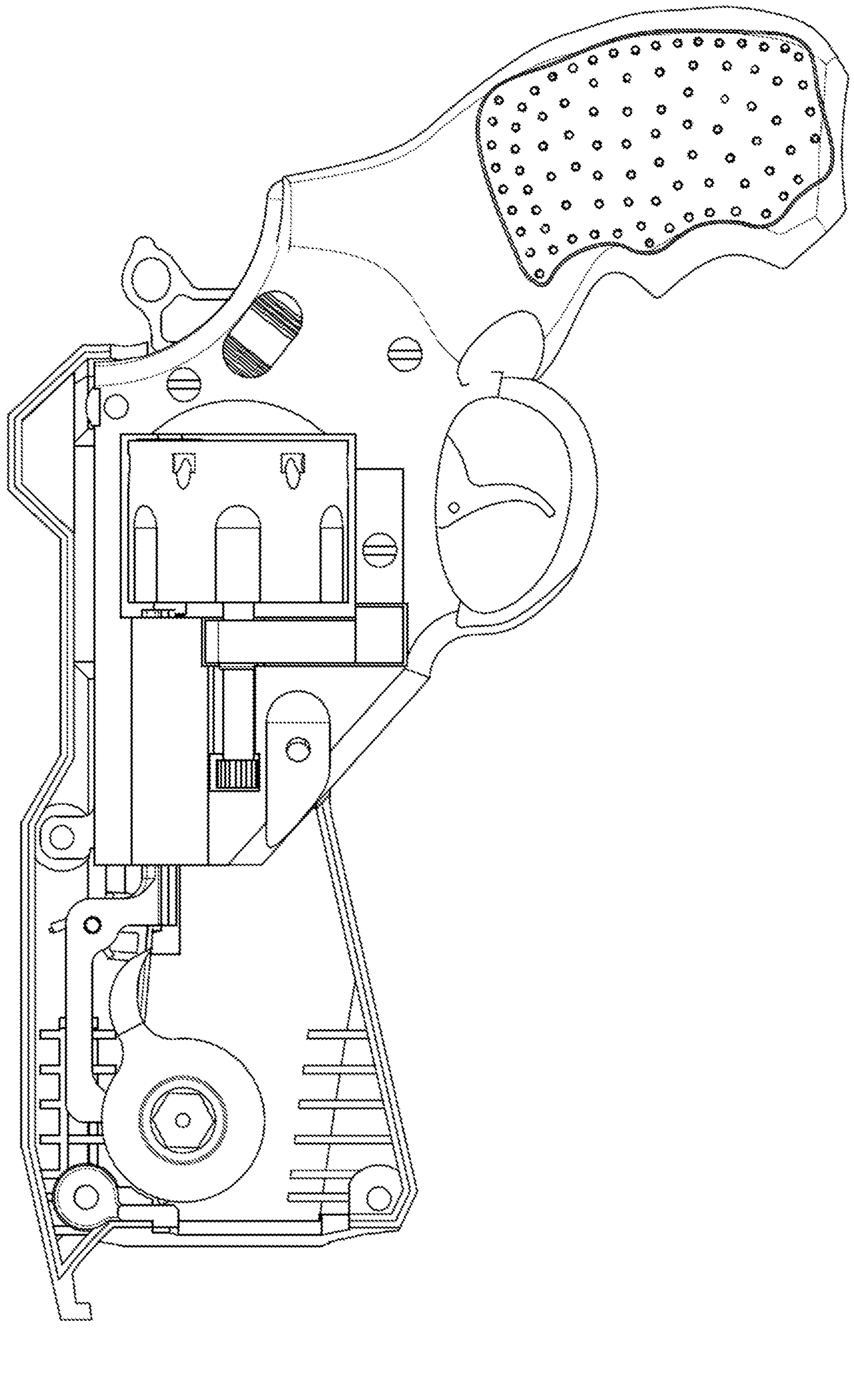
FIG. 11 is a partial cross-sectional view of the same as in FIG. 10.
Figure 12:
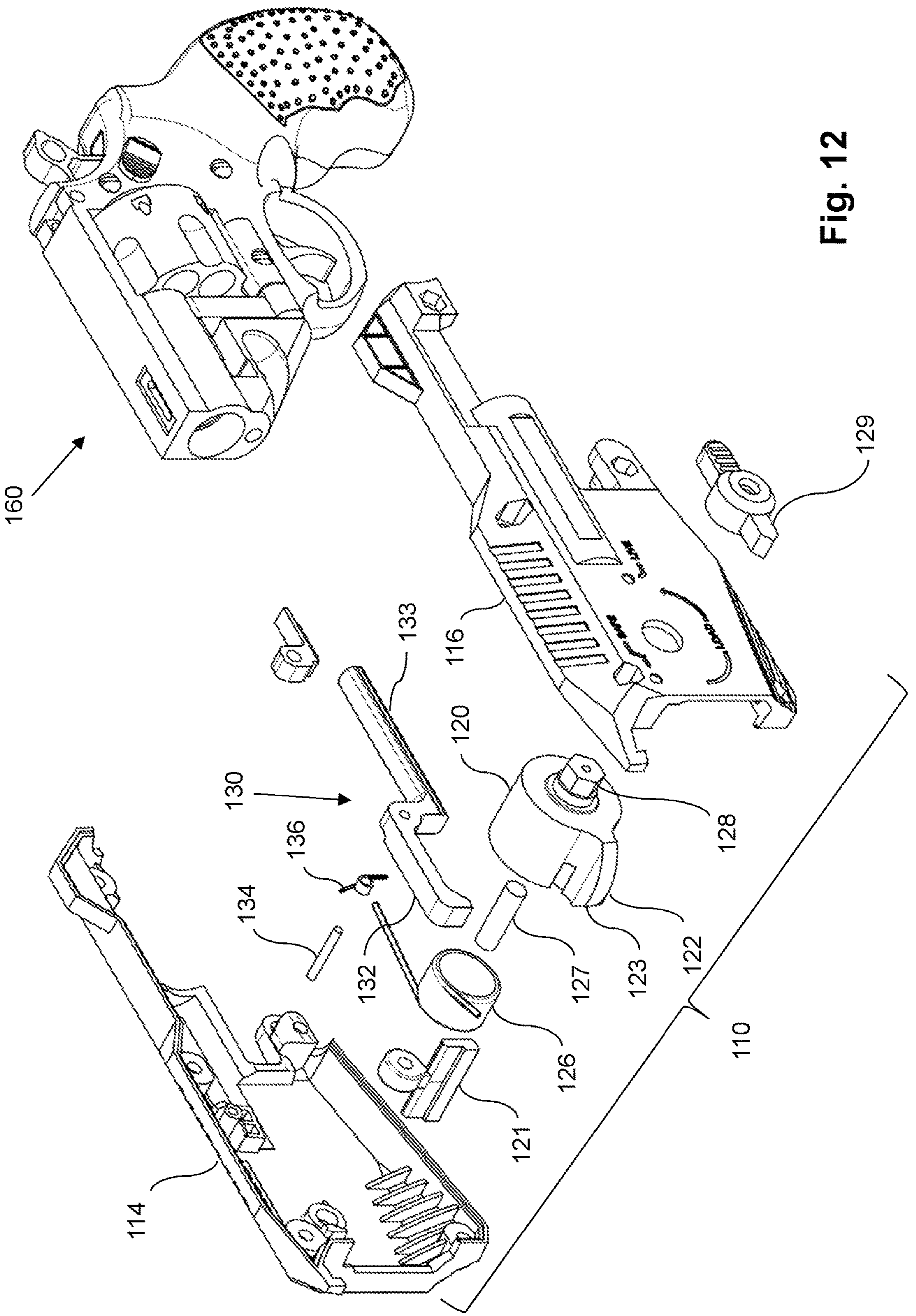
FIG. 12 is an exploded view of the front end components of the can piercing device.
Figure 13:
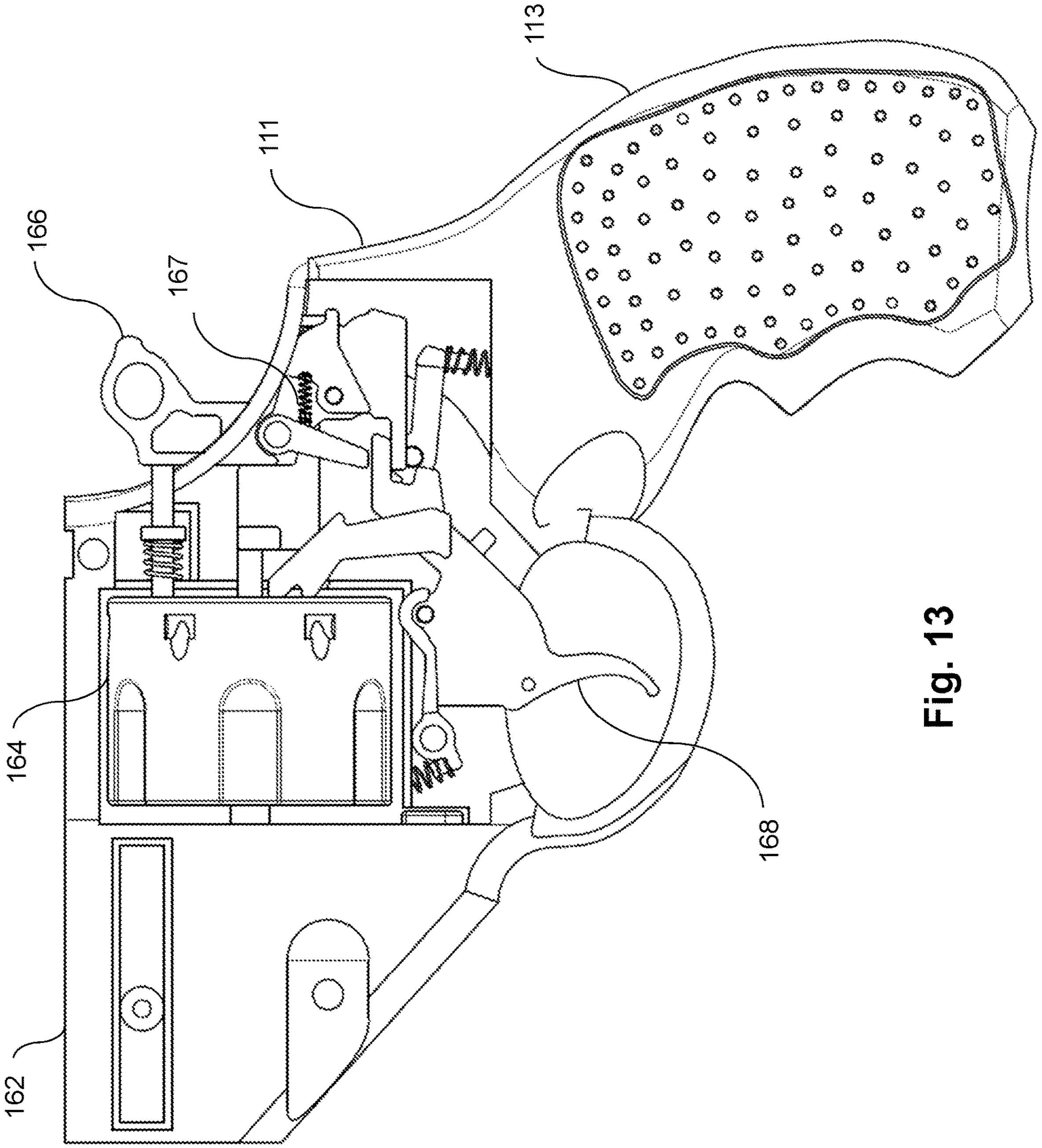
FIG. 13 is a partial cross-sectional view of the back end of the can piercing device showing the full cylinder and the hammer in the second position.
Figure 14:
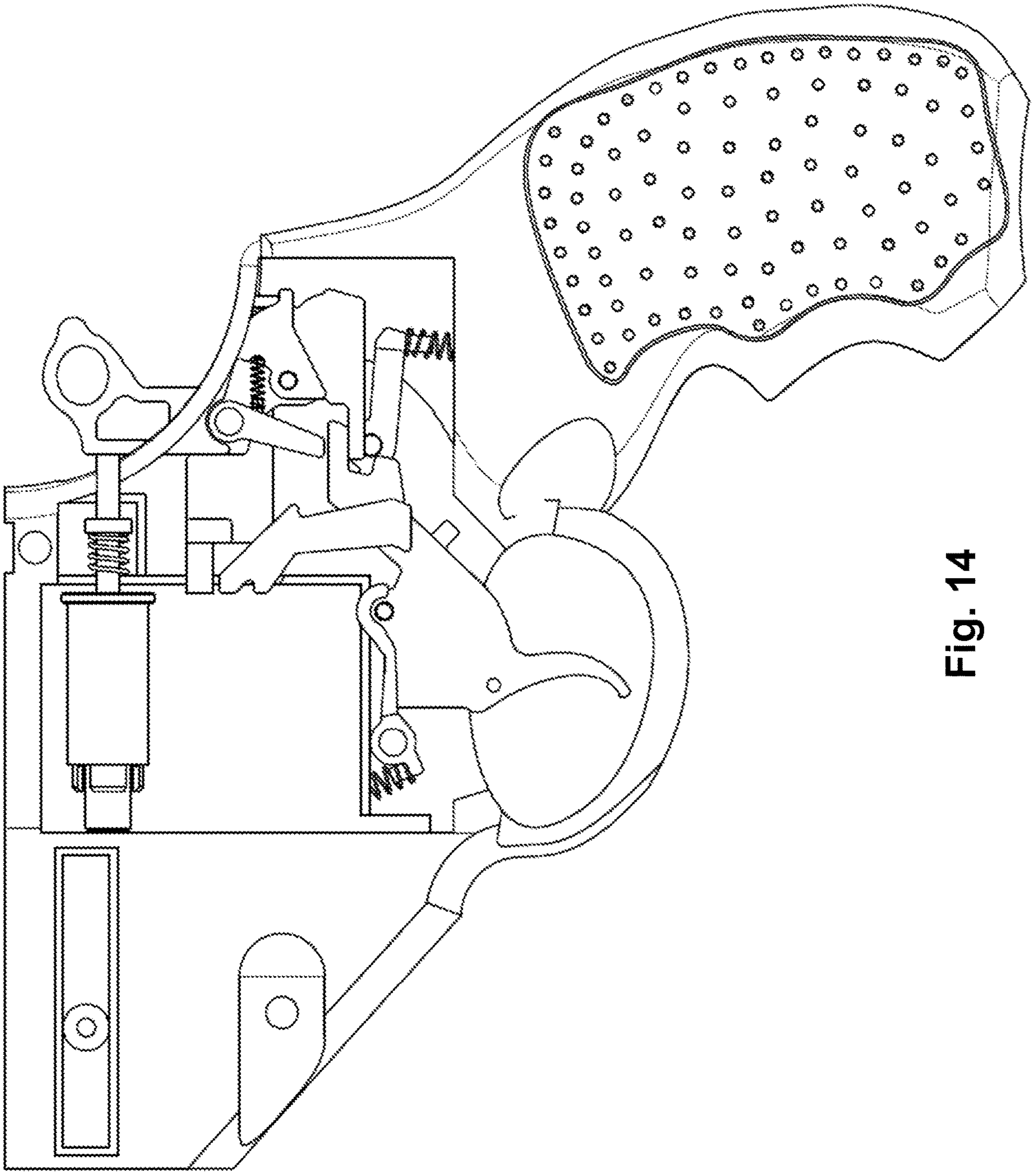
FIG. 14 is the same as in FIG. 13 but showing a simulated projected in the projectile position aligned with the hammer.
Figure 15:
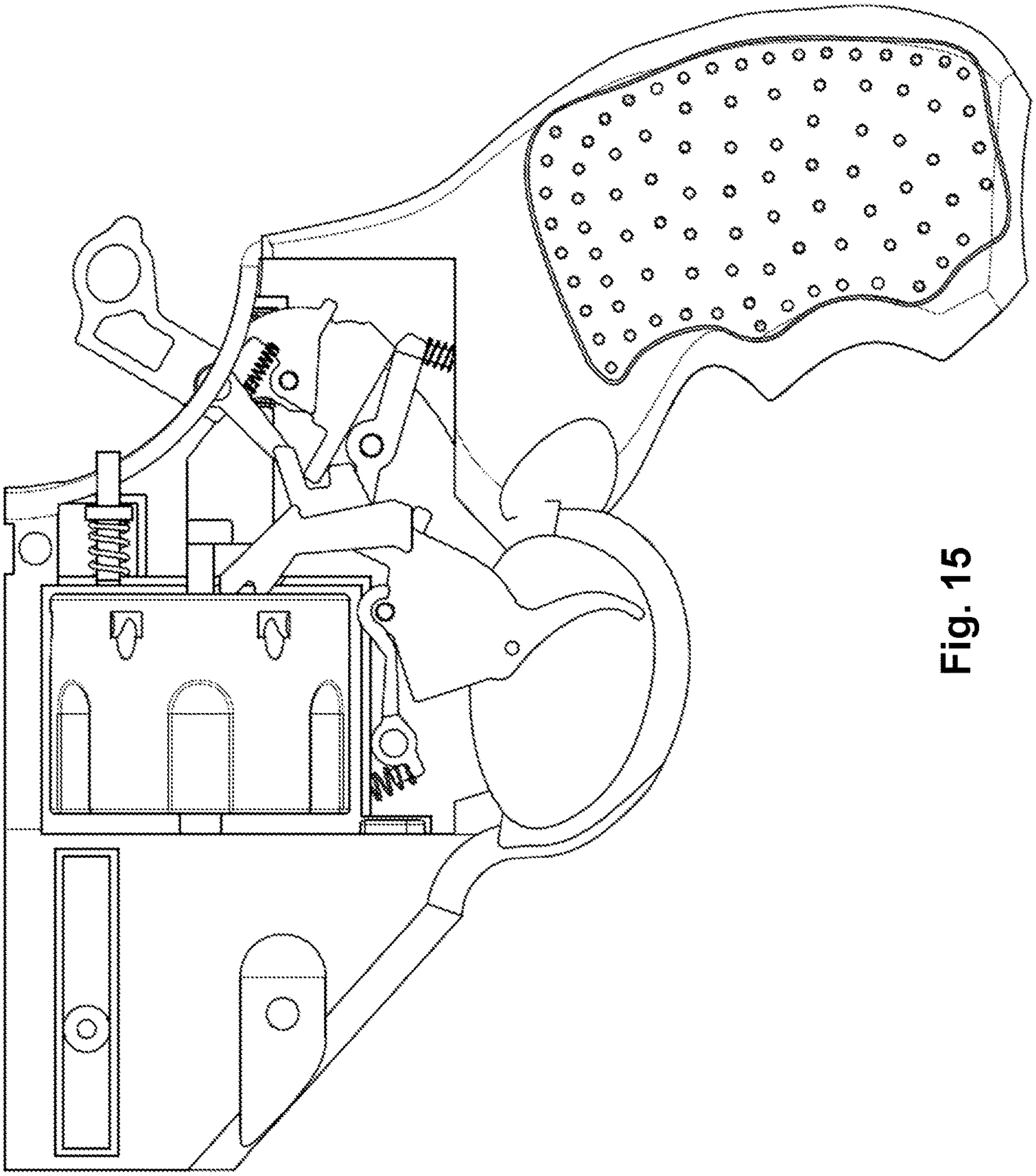
FIG. 15 is the same as in FIG. 13, but with the hammer in its first position.
Figure 16:
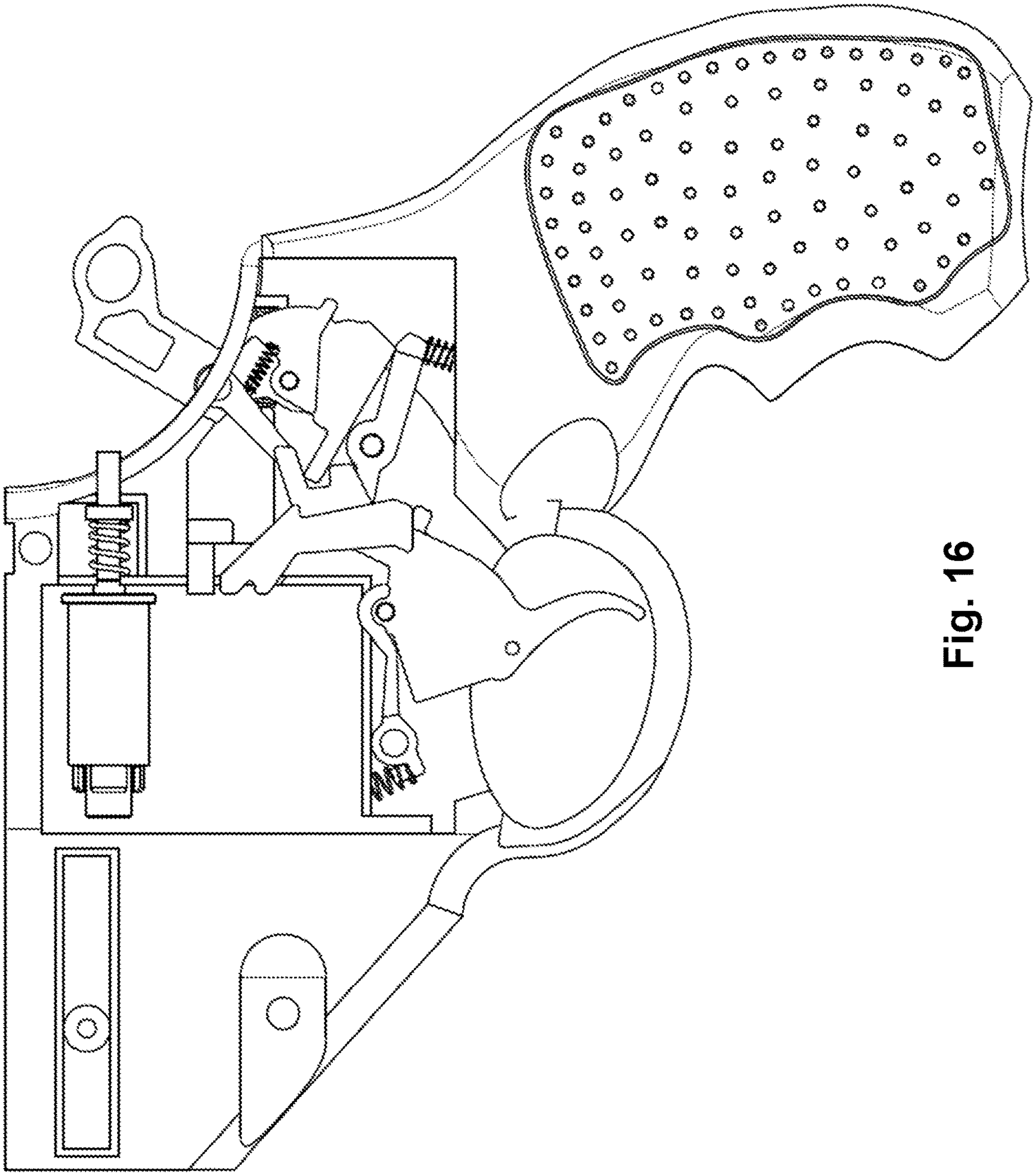
FIG. 16 is the same as in FIG. 14, but with the hammer in its first position.

The details of the front end 110 of the device housing are best seen in FIG. 8 through FIG. 12. In some embodiments, the device 100 may comprise a conventional toy gun 160 acting as a back end 111 and an attachment assembly forming together the front end 110, as seen in FIG. 12. In other embodiments, the can piercing device may be formed by individual dedicated components and not require the use of a conventional toy gun 160, as the invention is not limited in this regard.

The front end 110 of the device housing may broadly consist of a pair of symmetrical shell parts 114 and 116 that can form together the structural base for other components of the front end 110 to be attached to and supported by. The front end of the housing may include an optional can keeper configured when engaged with the can to retain the can adjacent to the front end of the housing. A variety of can keeper designs may be used with the can piercing device of the present invention, such as a ring sized to surround the can, a strap configured to envelop the cap, a cup sized to place the can inside thereof, and a C-shaped arm sized to have the can positioned inside thereof, all sized and configured to position the can adjacent to the front end of the housing. In other embodiments, there may be no can keeper component at all, as the can may be manually held next to the front end of the housing to facilitate the can piercing function thereof.

A conventional beverage can may define a bottom end with a circular rim, a side wall, and a top end containing a can opening tab. In this case, the can keeper may be shaped as a hook 112 configured to engage with or disengage from the circular rim of the bottom end of the can, while the front end is placed along the side wall of the can, as explained below in greater detail.

An axle pin 127 may be placed between the shell parts 114 and 116 to rotatably support a pivot 120 placed thereon. The pivot 120 may have a claw 122 extending therefrom. The claw 122 may have a sharp tip 123 and one or more sharp edges leading thereto. The claw 122 may be configured to pierce the beverage can with the sharp tip 123 and then tear a larger opening in the beverage can by the sharp edges cutting through the wall of the can as a result of the pivot 120 rotation and the claw 122 entering deeper into the can.

Figure 8:
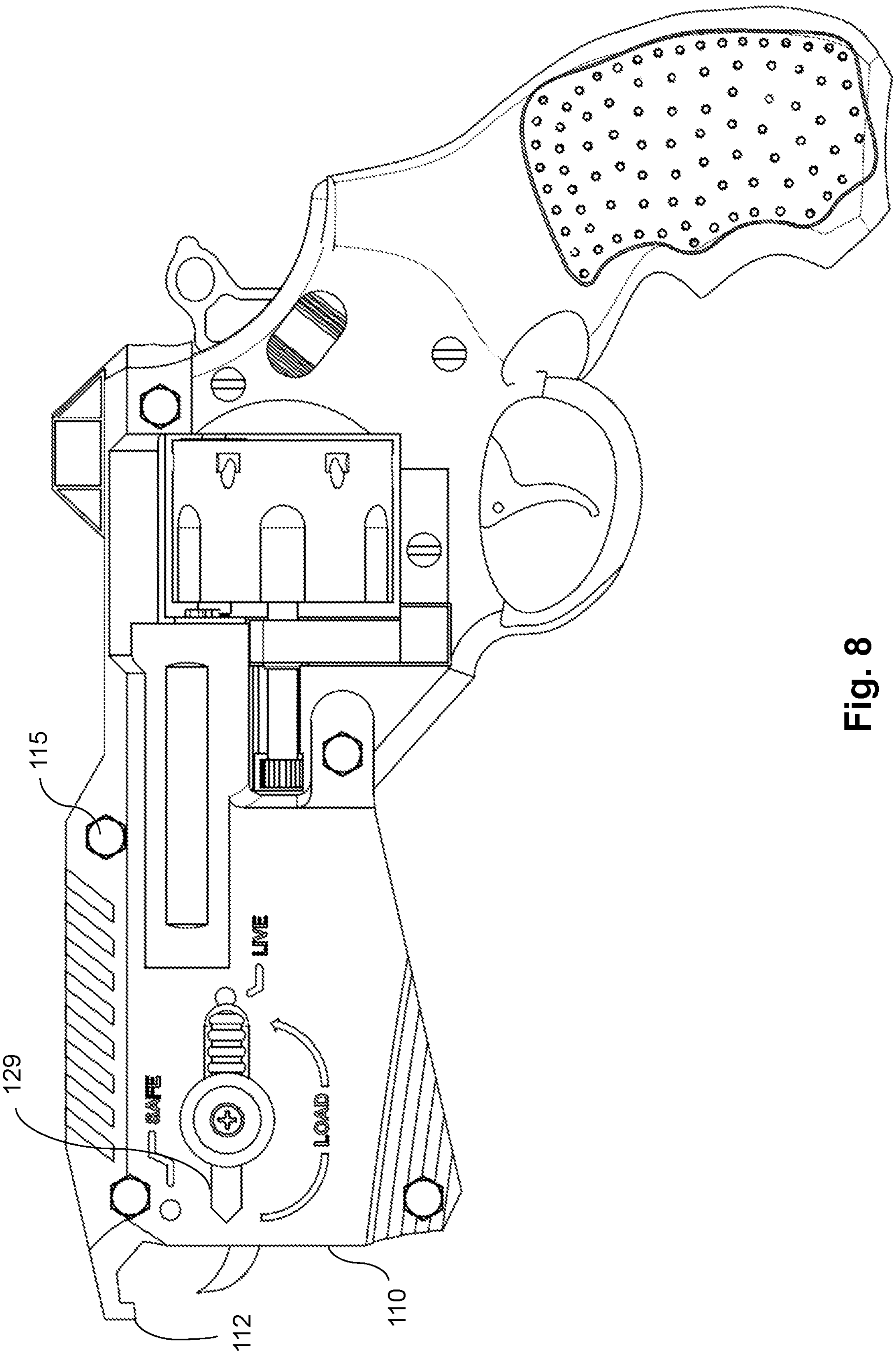
FIG. 8 is a side view of the can piercing device showing the details of the front end thereof with the claw in the extended position.
Figure 9:
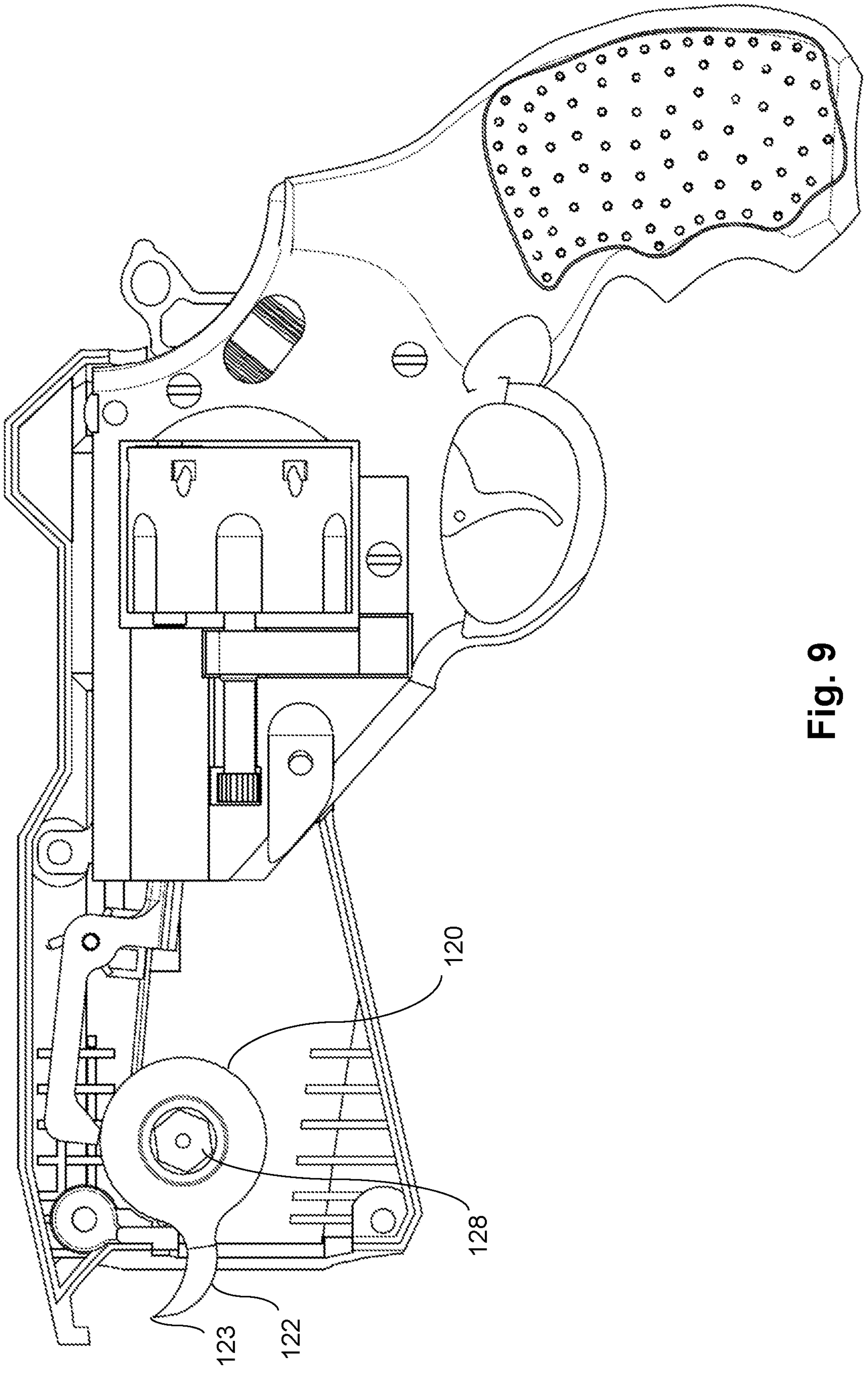
FIG. 9 is a partial cross-sectional view of the same as in FIG. 8.

The pivot 120 may be rotatably supported by the axle pin 127 and allowed to turn so as to move the claw 122 between a retracted position (seen in FIGS. 10 and 11) and an extended position (seen in FIGS. 8 and 9). An axial portion 128 of the pivot 120 may protrude on one side of the front end 110 through an opening in the shell part 116. A key handle 129 may be affixed to the axial portion 128 so as to allow manual rotation of the pivot 120 from outside the front end 110. The key handle 129 may also be used as a visual indicator of the position of the pivot 120 inside the front end 110.

A torsion cam spring 126 may also reside on the same axle pin in a concentrical arrangement with the pivot 120. One end of the cam spring 126 may be affixed to the front end, while the other end may be affixed to the pivot 120. This allows compression of the pivot spring 126 when the pivot 120 is turned from the extended position of the claw 122 to the retracted position of the claw 122. As can be appreciated by a person skilled in the art, other spring-loading designs may be used for the same purpose, as the invention is not limited in this regard. The pivot spring 126 may be selected to impart sufficient torque on the pivot 120 to allow reliable and consistent piercing of the beverage can by the sharp tip 123. In embodiments, the stiffness of the pivot spring 126 may be selected to be at least 1 N-mm/Degree, at least 1.5 N-mm/Degree, at least 2 N-mm/Degree, or at least 2.5 N-mm/Degree. A stopper 121 may be placed in the front end 110 to limit the rotation of the pivot 120 when released and ensure it stops at the designated extended position of the claw 122.

Retention of the pivot 120 in the retracted position of the claw may be facilitated by the release mechanism of the front end 110. Various designs of such mechanisms may be deployed. One example is seen in FIG. 12 and includes a release arm 130 pivotally supported at the front end 110 of the housing by the release axle 134. The release arm 130 may feature a front end 132 configured to engage with the pivot 120 to hold thereof in the retracted position of the claw 122. To achieve this, the pivot 120 may have a groove 124 (see FIGS. 17 and 18) configured to engage with the front end 132 of the release arm 130 when the claw 122 is in the retracted position. In use, pivoting the release arm 130 about the release axle 134 causes the front end 132 thereof to disengage from the groove 124 of the pivot 120 and liberate thereof to rotate the claw 122 from the retracted position to the extended position using the force of the pivot spring 126. A torsion release spring 136 may also reside on the release axle 134 and continuously urge the release arm to engage with the pivot 120. The release spring 136 may be selected to apply a low torque to the release arm 130 to keep the front end 132 thereof in continuous contact with the pivot 120. The stiffness of the release spring 136 may be sufficient to discourage an unintended release of the pivot 120 but, at the same time, does not substantially increase the force needed to pivot the release arm 130 during the operation of the release mechanism.

Figure 18:
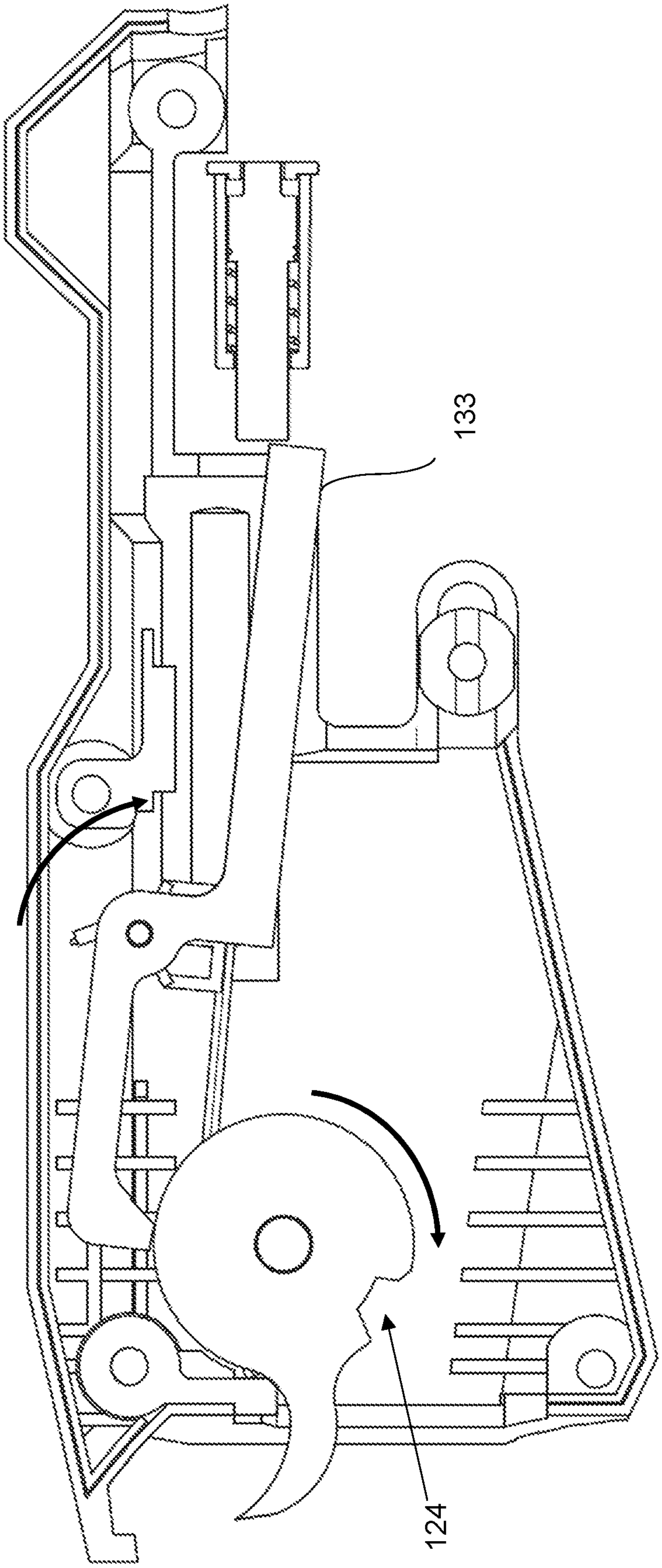
FIG. 18 is the same as in FIG. 17, but with the claw in the extended position.

The extended position of the claw 122 is seen in better detail in FIGS. 8, 9, and 18. The claw 122 protrudes in this position outside the opening in the front end 110 such that when in use and placed next to the beverage can (as explained in greater detail below), the claw 122 pierces and tears an opening in the can. The key handle 129 may be pointed forward, coinciding with the position of the claw 122.

Figure 17:
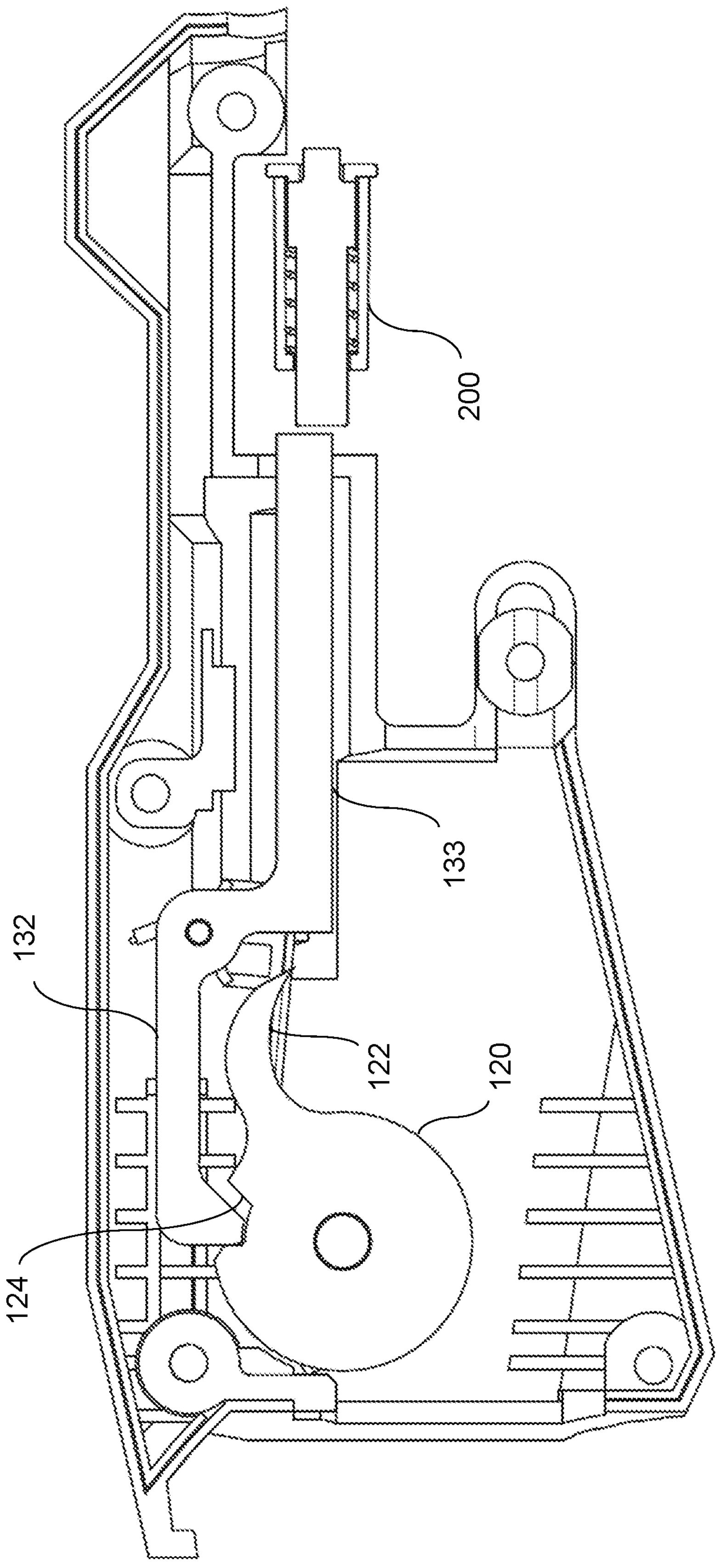
FIG. 17 is a cross-sectional view showing the details of the mechanical transmission and release mechanism with the claw in the retracted position.

The can piercing device 100 of the invention is seen in FIGS. 10, 11, and 17 in the retracted position of the claw 122. This is accomplished by rotating the key handle 129 to move the claw to the retracted position. The pivot 120 may be held in the retracted position of the claw 122 by the front end 132 of the release arm 130 engaging with the pivot 120, and, more specifically, falling into the pivot groove 124 see FIG. 17. The key handle 129 shows the "live" position of the claw 122, as seen in FIG. 10, indicating its readiness to be used for can piercing purposes.

In further embodiments, the pivot 120 may be optionally rotated to be placed into a third, "safe" position by turning the key handle 129 until it coincides with the "safe" position indicator on the front end 110. In this position, the claw is fully prevented from deployment, and no action of the trigger may cause the claw to emerge from the front end 110 of the device housing.

The exemplary design of the back end 111 of the device housing is now described in greater detail with reference to FIGS. 13-16. A toy revolver gun 160, while simplifying the complexity of a real firearm, embodies a design that may mimic the basic parts and operation of its real counterpart in a playful, safe manner. The main parts of a toy revolver gun 160 include a barrel 162, a cylinder 164, a trigger 168, a hammer 166, and a grip 113.

The barrel 162 is the front part of the toy gun 160 through which a simulated projectile 200, as described below, activated a mechanical transmission configured to release the claw 122 from the retracted position and cause the claw 122 to pierce the can. The back end 133 of the release arm 130 may be positioned inside the barrel 162 with the ability to have the release arm 130 to pivot about the release axis 134.

Most components of the toy gun 160, as well as the front end 110, may be made of lightweight plastic, with the exception of various springs, which may be typically made of metal. Central to the toy revolver's design is the cylinder 164, a rotating part that features multiple parallel projectile positions. This component mimics the revolver's real-life mechanism, allowing the toy gun 160 to "fire" one or several shots without needing to reload after each one. The cylinder 164 may be configured to rotate each time the toy gun 160 is cocked and "fired," aligning a new projectile position with the barrel 162.

The trigger 168, when pulled, initiates the "firing mechanism" configured to release a spring-loaded hammer 166 to advance from the first position to the second position as urged by the hammer spring 167. The trigger's pull may be designed to be light and easy.

Lastly, the grip 113 of the toy revolver 160 may be designed to be held comfortably in the hand. It is often also made from plastic, with ergonomics that allow for easy handling and operation by its intended user group. In embodiments, the grip 113 may also house a compartment for additional projectiles (not shown in the drawings).

The present invention further features at least one simulated projectile 200, as seen in FIGS. 4-7. The simulated projectile 200 may include a hollow elongated body 210 sized to fit within any of the projectile positions of the cylinder 164, the hollow elongated body 164 slidingly supports a spring-loaded internal pin 220 extending from the elongated hollow body on both ends thereof. To achieve this, the elongated hollow body 210 may have an endcap 240 on one end thereof, the endcap having a central cap opening 242.

The other end of the elongated hollow body 210 may have a body opening 214. The internal pin 220 may have a front end 222 protruding through the body opening 214 and a back end 224 protruding through the endcap opening 242. An enlarged central portion 226 of the internal pin 220 may be configured to abut the internal pin spring 230 positioned within the elongated hollow body with the other end of the internal pin spring 230 located against the body opening 214. The internal pin spring 230 may be configured to push the enlarged central portion 226 of the internal pin 220 towards the endcap 240 so as to urge the back end 224 to protrude therethrough. The length of the internal pin 220 may be selected to be greater than the length of the elongated hollow body 210 so as to allow activation of the mechanical transmission, as explained in the description below. At the same time, the length of the internal pin 220 may not be longer than the length of any of the projectile positions in the cylinder 164, so as to not interfere with the rotation of the cylinder to advance the next projectile position to be in alignment with the hammer 166 and the barrel 162.

In addition to the simulated projectile 200 described above, the can piercing device of the invention may be provided with one or more blank projectiles. A blank projectile may have the same external dimensions and even have the same visual appearance as the simulated projectile 200 but without the sliding internal pin 220. In one embodiment, the blank projectile may be made entirely as a solid piece.

Operation of the toy revolver 160 begins with loading one or more simulated projectiles 200 into the cylinder 164. Each simulated projectile 200 is inserted until its endcap 240 abuts the cylinder 164. Once the toy gun 160 is loaded, the user may cock the gun by pulling back the hammer 166. This action rotates the cylinder 164, positioning the simulated projectile 200 (if present) in line with the barrel 162. At the same time, the key handle 129 may be rotated to position the claw 122 to the retracted position and compress the pivot spring 126.

Figure 19:
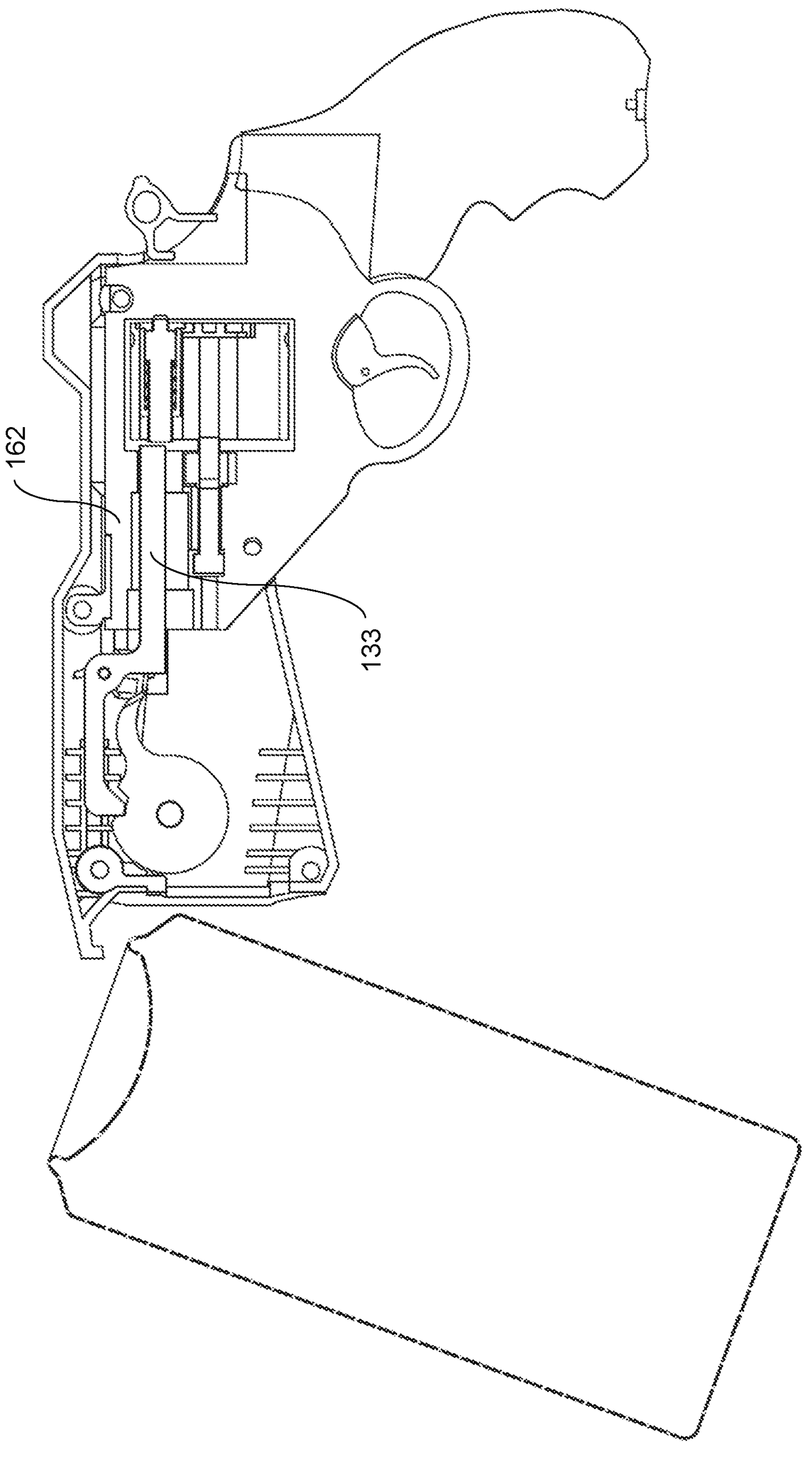
FIG. 19 is a partial cross-sectional view of the front end of the can piercing device while engaging with a beverage can.
Figure 20:
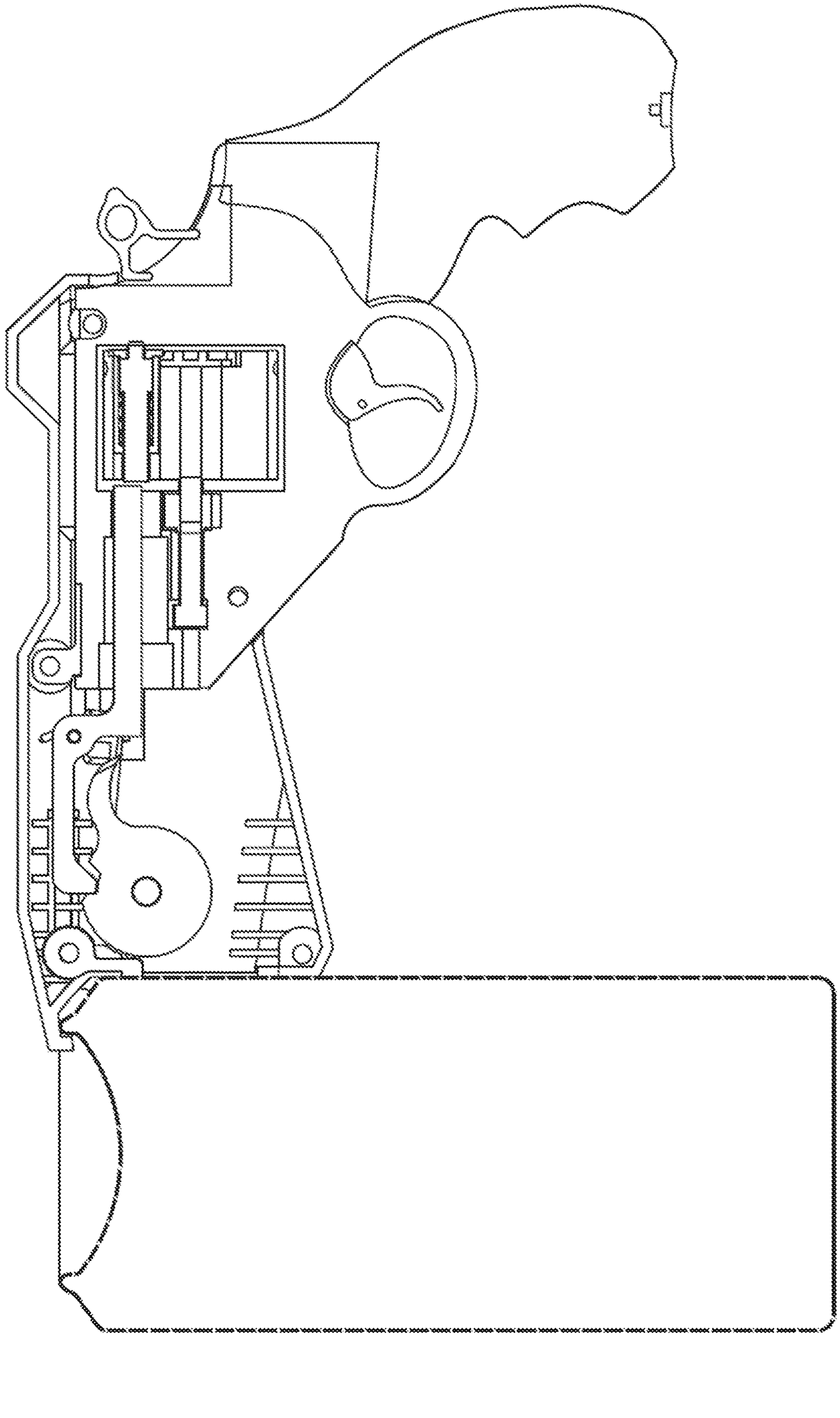
FIG. 20 is the same while positioning the front end next to a side wall of the beverage can.

The can piercing device 100 may then be located next to the side wall and adjacent to the circular rim of the bottom of the beverage can, as seen in FIG. 19. The hook 112 may be engaged with the circular rim, and the front end 110 of the device housing may be placed firmly against the side wall of the can—see FIG. 20. Positions of all internal components of the can piercing device 100 at that moment is seen in FIG. 17.

Figure 21:
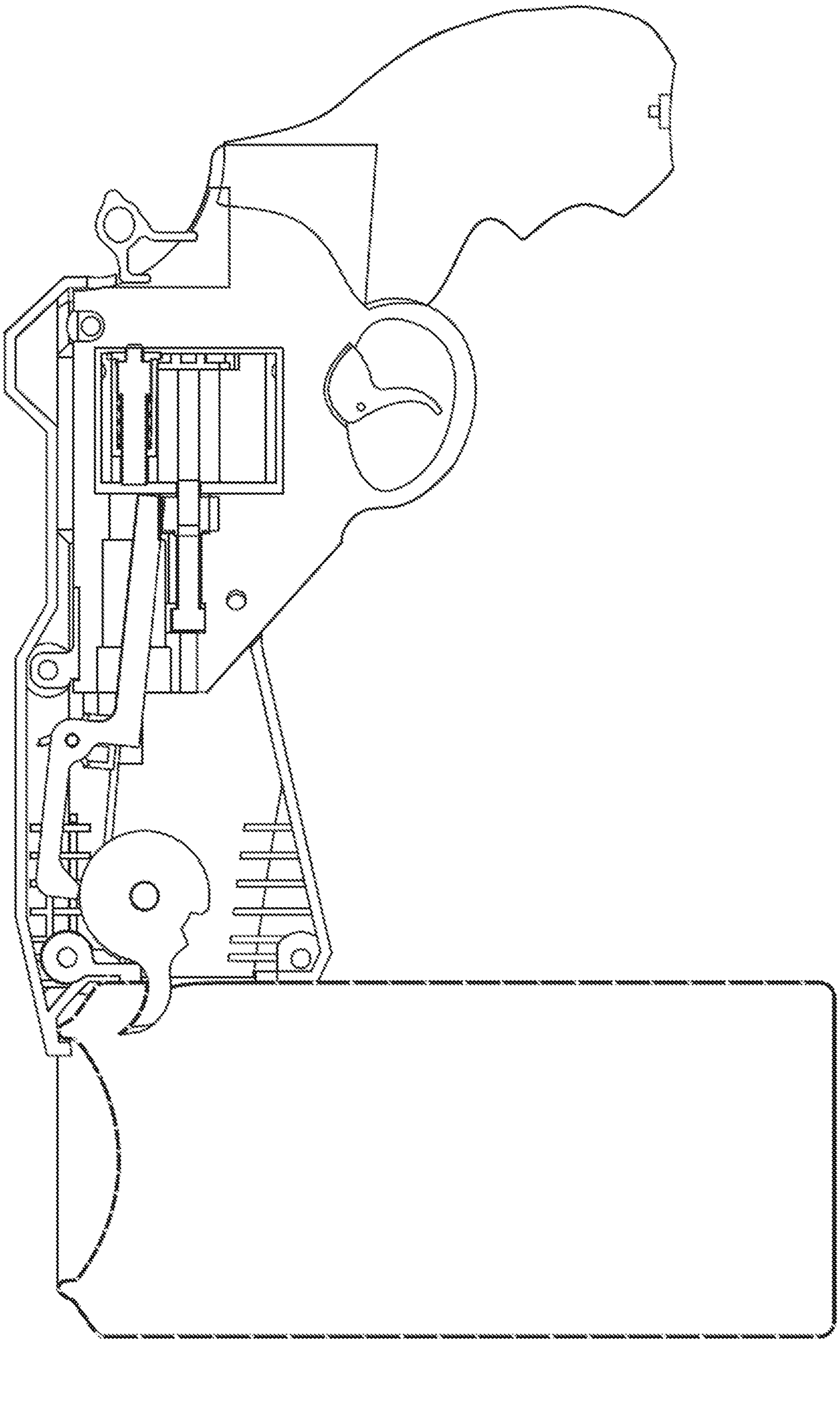
FIG. 21 is the same after the claw has pierced and torn the beverage can.
Figure 22:
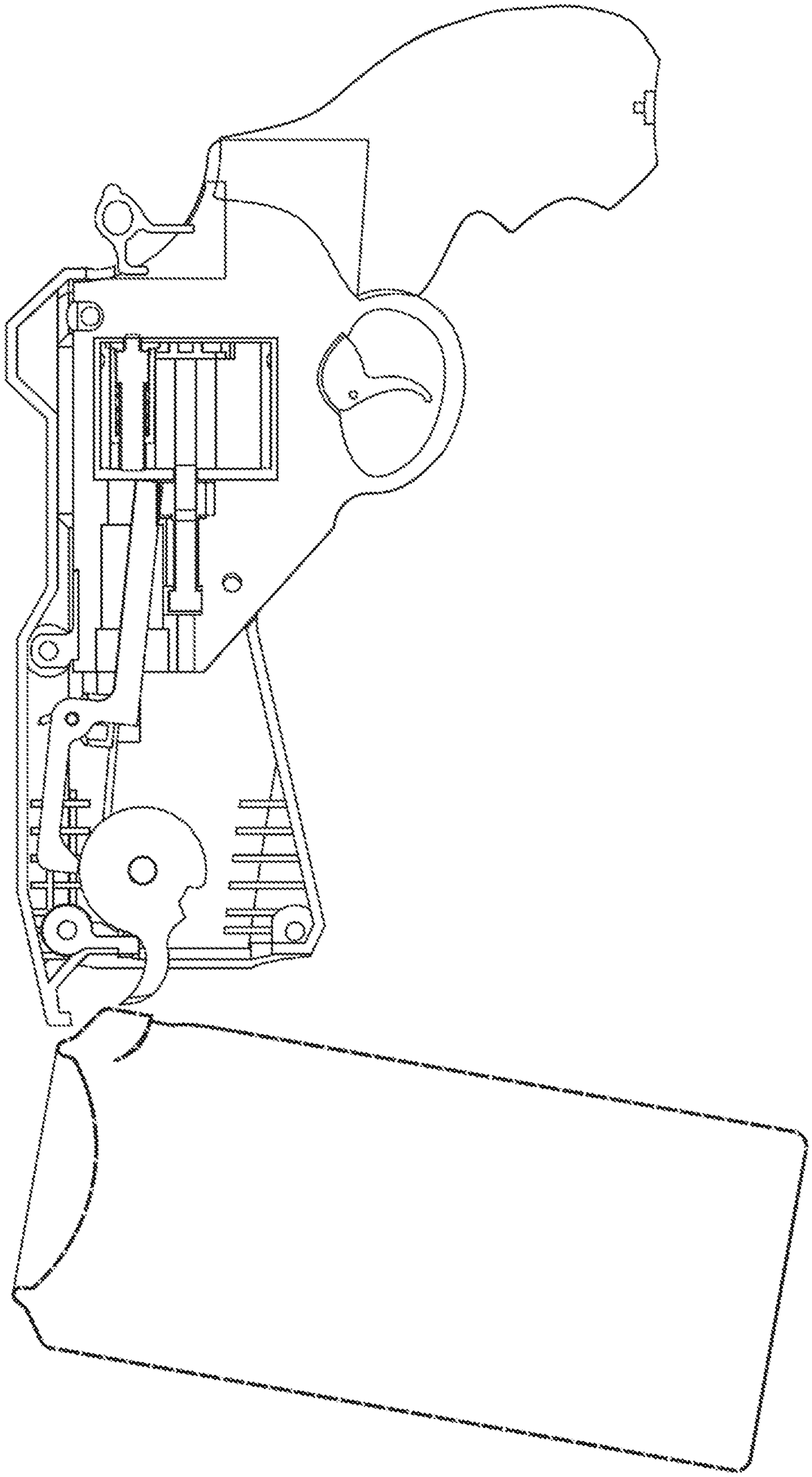
FIG. 22 shows a removal of the device from the pierced beverage can.

When the trigger 168 is pulled, the mechanism inside the toy gun 160 releases the hammer 166 to cause it to strike the back end 224 of the internal pin 220, which propels the internal pin 220 forward and toward the front end 110. The internal pin 220 then strikes the back end 133 of the release arm 130 causing the release arm to pivot about the release axis 134—see FIG. 18. This action, in turn, causes the front end 132 of the release arm 130 to disengage from the groove 124 in the pivot 120, thereby releasing the pivot 120 to rotate in the direction of the arrow seen in FIG. 18. The claw 122 is therefore rotated from the retracted position to the extended position and emerges from the front end 110 to pierce and tear an opening in the can—see FIG. 21. The action of the can piercing device 100 at this point is complete and the entire device 100 may be removed from the can by rotating it upward around the hook 112 and around the circular rim of the can. Once the device 100 is disengaged, it can be removed from the can, as seen in FIG. 22.

The operation of the can piercing device 100 may then be repeated by following the same steps as described above. As can be appreciated by the person skilled in the art, if no simulated projectile is present in the cylinder (or if a blank projectile is present) at the time of pulling the trigger, the entire chain of events would not happen, and the claw 122 would not be released.

The presence of the cylinder 164 allows for using the can piercing device 100 with additional entertainment value, namely when the user inserts only one or two simulated projectiles in the cylinder 164, each firing of the hammer 166 becomes uncertain, similar to a famous "Russian roulette" game. Uncertainty as to which pull of the trigger 168 would actually cause the piercing of the beverage can, adds further entertainment value to the present invention.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least 1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A can piercing device for facilitating rapid beverage consumption from a can, the can piercing device comprises:

a housing with a front end equipped with a pivot rotatably supported inside thereof, the pivot is equipped with a claw protruding therefrom and configured to pierce and tear a side wall of the can upon engaging therewith, the pivot is rotatable to move the claw between a retracted position and an extended position with the claw protruding outside the front end of the housing, wherein the front end of the housing further comprises a pivot spring configured to urge the pivot to rotate the claw from the retracted position to the extended position upon being released by a release mechanism supported by the housing, wherein the release mechanism is configured to hold the claw in the retracted position by engaging with the pivot, the release mechanism further comprises a release arm pivotally supported within the housing and rotationally aligned with the pivot, the release arm having a front end configured to engage with the pivot, wherein the pivot comprises a groove configured to engage with the front end of the release arm when the claw is in the retracted position, whereby pivoting the release arm causes the front end thereof to disengage from the groove of the pivot and liberate thereof to move the claw from the retracted position to the extended position, causing the claw to pierce and tear the can upon engaging therewith.

2. The can piercing device, as in claim 1, wherein the front end of the housing further comprises a can keeper configured when engaged with the can to retain the can adjacent to the front end of the housing.

3. The can piercing device, as in claim 2, wherein the can keeper comprises a hook configured to engage from above with a circular rim of a top end of the can while the front end of the housing is placed along the side wall of the can.

4. The can piercing device, as in claim 3, wherein the hook is configured to allow tilting the front end of the housing around the circular rim to withdraw the claw from the can while in the extended position.

5. The can piercing device, as in claim 1, wherein the claw in the retracted position is stored inside the front end of the housing.

6. A can piercing device for facilitating rapid beverage consumption from a can, the can piercing device comprises:

a housing with a front end equipped with a spring-loaded claw movable between a retracted position and an extended position with the claw protruding outside the front end of the housing, wherein the housing further comprises a claw spring configured to urge the claw to move from the retracted position to the extended position, wherein the housing further comprises a back end with a spring-loaded hammer movable between a first position and a second position, a hammer spring configured to urge the hammer to move from the first position to the second position, a trigger configured to release the hammer from the first position upon pulling thereon, and a rotatable cylinder with a plurality of projectile positions, each position is configured to accept a removable simulated projectile therein, wherein when the simulated projectile is present in the projectile position of the cylinder which is aligned with the hammer, releasing the hammer by pulling the trigger activates a mechanical transmission configured to release the claw from the retracted position and cause the claw to pierce the can, wherein when the simulated projectile is not present in the projectile position of the cylinder which is aligned with the hammer, releasing the hammer by pulling the trigger does not activate the mechanical transmission, thereby not causing the claw to pierce the can.

7. The can piercing device, as in claim 6, wherein the simulated projectile comprises a hollow elongated body sized to fit within any of the projectile positions of the cylinder, the hollow elongated body slidingly supports an internal pin extending from the elongated hollow body on both ends thereof.

8. The can piercing device, as in claim 6, further comprising at least one blank projectile shaped as a copy of the simulated projectile but made without the sliding internal pin, whereby when the blank projectile is present in the projectile position of the cylinder which is aligned with the hammer, releasing the hammer by pulling the trigger does not activate the mechanical transmission, thereby not causing the claw to pierce the can.

* * * * *